US008035023B2

United States Patent
Hernandez et al.

(10) Patent No.: US 8,035,023 B2
(45) Date of Patent: Oct. 11, 2011

(54) PREDICTIVE ENVIRONMENT MUSIC PLAYLIST SELECTION

(75) Inventors: Marcial Hernandez, Mountain View, CA (US); Arne Stoschek, Palo Alto, CA (US); Jason Swager, San Mateo, CA (US); Charles Lee, San Francisco, CA (US)

(73) Assignee: Volkswagen AG, Wolfsburg (DE)

( * ) Notice: Subject to any disclaimer, the term of this patent is extended or adjusted under 35 U.S.C. 154(b) by 105 days.

(21) Appl. No.: 12/546,913

(22) Filed: Aug. 25, 2009

(65) Prior Publication Data

US 2011/0054646 A1    Mar. 3, 2011

(51) Int. Cl.
*G10H 1/00* (2006.01)
*G10H 1/18* (2006.01)

(52) U.S. Cl. ............ 84/615; 84/600; 84/602; 84/610; 84/618; 84/634; 84/650; 84/653; 84/656

(58) Field of Classification Search .......... None
See application file for complete search history.

(56) References Cited

U.S. PATENT DOCUMENTS

| 7,132,596 | B2 | 11/2006 | Nakabo et al. | |
|---|---|---|---|---|
| 7,560,637 | B1 * | 7/2009 | Robbin et al. | 84/615 |
| 7,745,716 | B1 * | 6/2010 | Murphy | 84/612 |
| 2008/0156173 | A1 * | 7/2008 | Bauer | 84/601 |

FOREIGN PATENT DOCUMENTS

| DE | 102004027286 | 12/2004 |
|---|---|---|
| EP | 1850092 A1 | 10/2007 |
| EP | 1930875 A2 | 6/2008 |
| JP | 8245953 A | 9/1996 |

* cited by examiner

*Primary Examiner* — Marlo Fletcher
(74) *Attorney, Agent, or Firm* — King & Spalding L.L.P.

(57) ABSTRACT

An entertainment system has a music storage system storing a plurality of music pieces, a playback system coupled with the music storage system, a navigation system providing current map information including a present location, wherein a current map has a plurality of zones each being assigned to one of a plurality of zone types, and a controller for controlling playback of selected music pieces, wherein the controller maintains a plurality of playlists, each having a plurality of music pieces and being assigned to at least one zone type. The controller receives information of a present location and a current zone type and selects an assigned playlist, wherein the navigation system further provides information about a distance and/or time to a next zone. The controller modifies the assigned playlist such that a transition to the next zone is timely synchronized with the ending of a music piece of the assigned playlist.

20 Claims, 4 Drawing Sheets

PREDICTIVE ENVIRONMENT MUSIC PLAYLIST SELECTION

TECHNICAL FIELD

The present disclosure relates generally to the field of entertainment systems, in particular for use in vehicles.

BACKGROUND

Today's music entertainment systems in vehicle are often based on digital music players that contain a variety of playlists with a plurality of different music pieces. In many cars music can be played from an external portable media player or an onboard system. A stored media or radio is often chosen at random independently of the environment the vehicle is operating in.

In other applications, conventional portable music systems are used for exercising wherein a portable player detects whether a runner drifts off their desired predetermined pace. In such a case the portable player is controlled to start choosing songs from a motivational playlist rather than the standard playlist in order to help the runner maintain their desired pace. The idea in this case is to look at a performance variable such as the pace of the runner, and choose music appropriately to help bring the runner to a predetermined pace.

Some conventional vehicle music entertainment systems affect the music based on the driving conditions such as raising and lowering the volume of the music based on the vehicle speed, or driver cognitive loads from navigation or incoming phone calls. These systems look at the immediate state of the vehicle, and once they detect a specific condition, they react without foresight. For example, U.S. Pat. No. 7,132,596 discloses an automatic music selecting system which can select a piece of music for a driver of a vehicle depending on certain parameters. It includes a music storing device that stores a plurality of music pieces and a navigation system for detecting the current position of the vehicle. Such a system uses a current position information and sensors for detecting environmental conditions, such as a location or weather, or time, to select a music piece. Thus, depending on certain parameters, a specific music piece is selected.

However, this can lead to abrupt changes and uncoordinated playlists. Hence, there is a need for a more sophisticated music selection system for vehicles. The goal is to make the driving experience more pleasurable, as if the drive were scripted to contain a soundtrack.

SUMMARY

According to an embodiment, an entertainment system may comprise a music storage system operable to store a plurality of music pieces; a playback system coupled with said music storage system; a navigation system providing current map information including a present location, wherein a current map comprises a plurality of zones, each zone being assigned to one of a plurality of zone types; and a controller coupled with said navigation system and said music storage system for controlling playback of selected music pieces, wherein the controller maintains a plurality of playlists, each playlist comprising a plurality of music pieces and wherein each playlist is assigned to at least one zone type; wherein the controller receives information of a present location and a current zone type and selects an assigned playlist, wherein the navigation system further provides information about at least one of a distance or time to a next zone, and wherein the controller modifies the assigned playlist such that a transition to said next zone is timely synchronized with the ending of a music piece of the assigned playlist.

According to a further embodiment, the controller may further be operable to define said zones according to manual input. According to a further embodiment, the controller may further be operable to define said zones automatically according to metadata or additional map information. According to a further embodiment, a zone can be assigned to a zone type by at least one of external driving conditions, environmental factors surrounding a road in said zone, and the shape of a road in said zone type. According to a further embodiment, the transition to said next zone can be defined by a time window. According to a further embodiment, the time window may be about 15 seconds. According to a further embodiment, the controller may modify said playlist by re-arranging music pieces of said playlist. According to a further embodiment, the controller may modify said playlist by adding or deleting of a music piece in said playlist. According to a further embodiment, the controller may modify said playlist by speeding-up or slowing-down playback of said playlist. According to a further embodiment, the system mat further comprise a telematic system coupled with said controller for receiving traffic related information and wherein said traffic related information is used to correct said distance or time to a next zone.

According to another embodiment, a method for selecting music pieces in a playlist of music playback system, may comprise the steps of defining a plurality of zones in a map each zone being assigned to one of a plurality of zone types; defining a plurality of playlists, each playlist being associated with at least one zone type and containing a plurality of music pieces; determining a position in said map and an current zone; determining a zone type of a next zone and a time or distance to transition to said next zone; arranging music pieces of a current playlist associated to said current zone such at a transition to said next zone a music pieces in said current playlist ends.

According to a further embodiment, the transition to said next zone can be defined by a time window. According to a further embodiment, the time window can be about 15 seconds. According to a further embodiment, the plurality of zones can be defined manual or automatically according to metadata or additional map information. According to a further embodiment, a zone can be assigned to a zone type by at least one of external driving conditions, environmental factors surrounding a road in said zone, and the shape of a road in said zone. According to a further embodiment, the method may further comprise the step of modifying said current playlist by re-arranging music pieces of said playlist if the time or distance to said next zone changes. According to a further embodiment, the method may further comprise the step of modifying said playlist by adding or deleting of a music piece in said playlist if the time or distance to said next zone changes. According to a further embodiment, the method may further comprise the step of modifying said playlist by speeding-up or slowing-down playback of said playlist if the time or distance to said next zone changes. According to a further embodiment, the method may further comprise the step of receiving traffic related information and using said traffic related information to correct said time or distance to a next zone.

According to yet another embodiment, a computer readable medium may store instructions which are executable by a processor or controller in a music entertainment system, wherein when executed, the processor or controller controls the music entertainment system to define a plurality of zones in a map each zone being assigned to one of a plurality of zone types; to define a plurality of playlists, each playlist being associated with at least one zone type and containing a plurality of music pieces; to determine a position in said map and an current zone; to determine a zone type of a next zone and a time or distance to transition to said next zone; and to arrange music pieces of a current playlist associated to said current zone such that at a transition to said next zone a music pieces in said current playlist ends.

BRIEF DESCRIPTION OF THE DRAWINGS

Some embodiments of the disclosure may be understood by referring, in part, to the following description and the accompanying drawings wherein.

DETAILED DESCRIPTION OF THE DRAWINGS

Selected embodiments of the disclosure may be understood by reference, in part, to FIGS. 1-6, wherein like numbers refer to same and like parts. The present disclosure is broadly concerned with systems and methods for selecting and/or creating playlist used in a music entertainment system of a vehicle.

In today's world the driving experience can be altered significantly by the music that the driver is listening to. More importantly the transitions between different music pieces may have a significant impact on a driver's mood. The term music piece is to be understood to describe a variety of music representations, such as single or multiple songs from any genre, classical compositions including single movements, entire symphonies, concerts, chamber music, improvisations, etc.

In many cases the right song, at the right time can dramatically improve the driver's mood and serve to significantly improve the driving experience. According to an embodiment, a playlist can be synchronized with specific events, in particular measurable or detectable events during driving. A playlist defines a sequence of musical pieces. For example, it would be beneficial for a driver's mood if a current song ends just as, for example, the ocean comes into view and playing one of your favorite "relaxing" songs, or as you're driving towards a canyon an "exciting" song starts playing as you hit the first turn in a winding road.

According to various embodiments, a system may look at the road and utilizes currently known information to characterize road segments into one of several zones ahead of time. The characterization could be done ahead of time such that each road segment included metadata characterizing the type of zone that road belongs in, and could be coupled with some machine learning to fine tune to driver preferences to make sure that the characterization is matched to the driver. According to an embodiment, roads may be partitioned into specific road segments according to a predefined zone scheme manually or automatically. According to an embodiment, some simple algorithms can be used on an onboard computer system utilizing existing map data provided by a navigation system. Such an embodiment can be used to further enhance existing systems and provide a more enjoyable driving experience.

Figure 1:
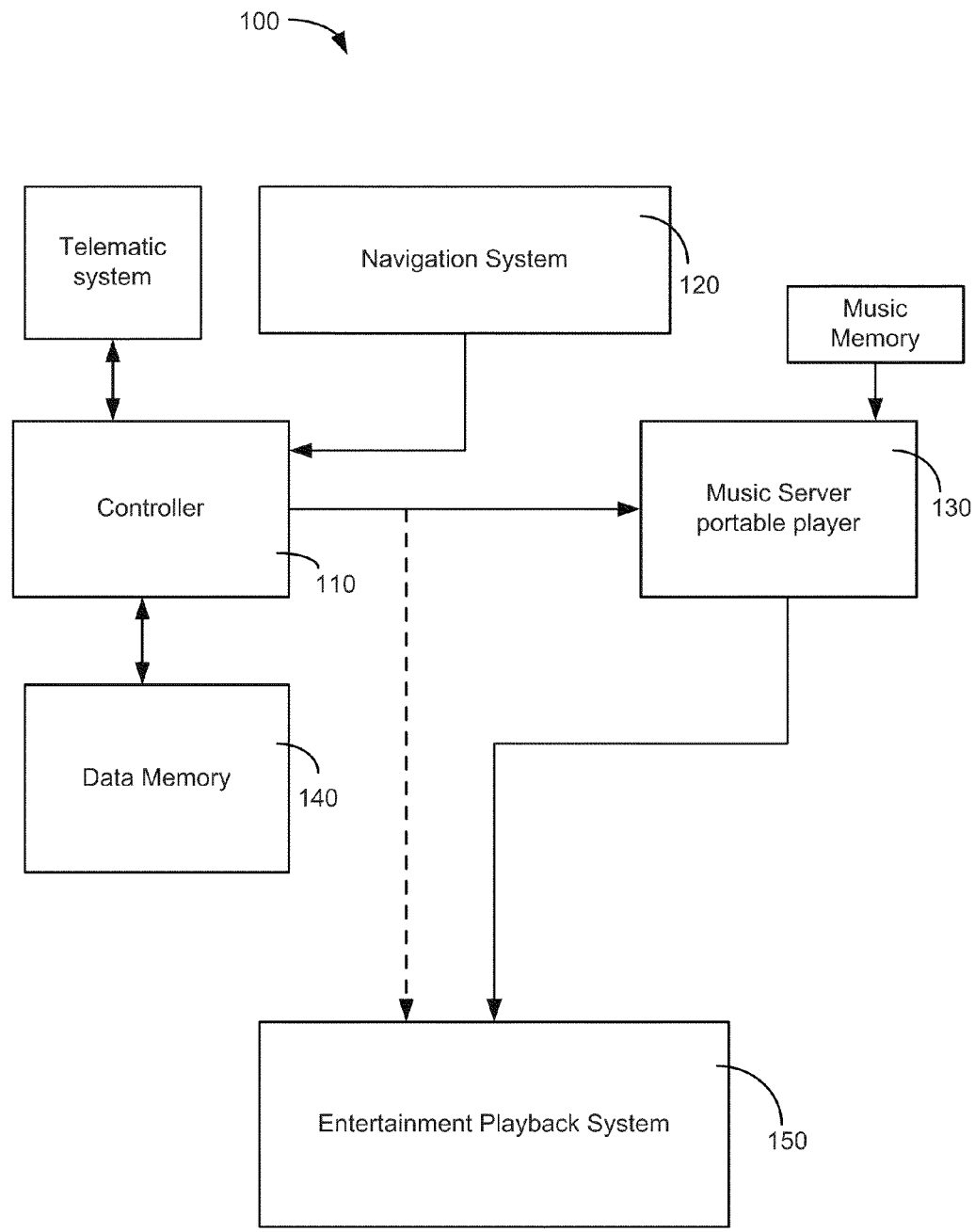
FIG. 1 illustrates a block diagram of an embodiment of a music entertainment system in a vehicle.
Figure 2:
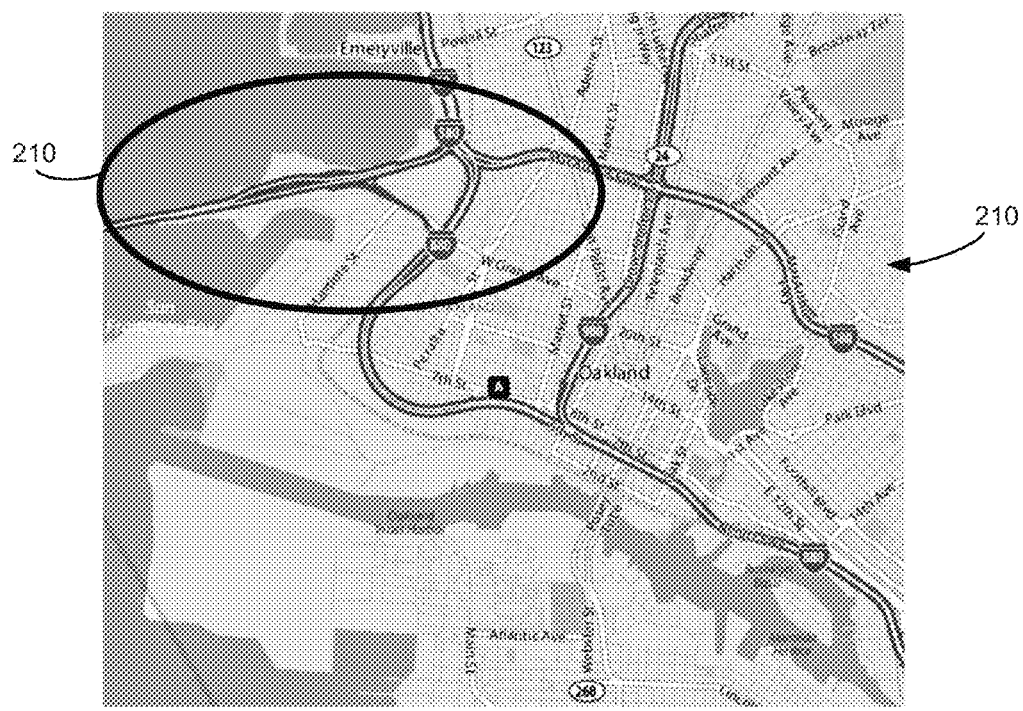
FIGS. 2 and 3 show examples of different zones as used in an embodiment.
Figure 3:
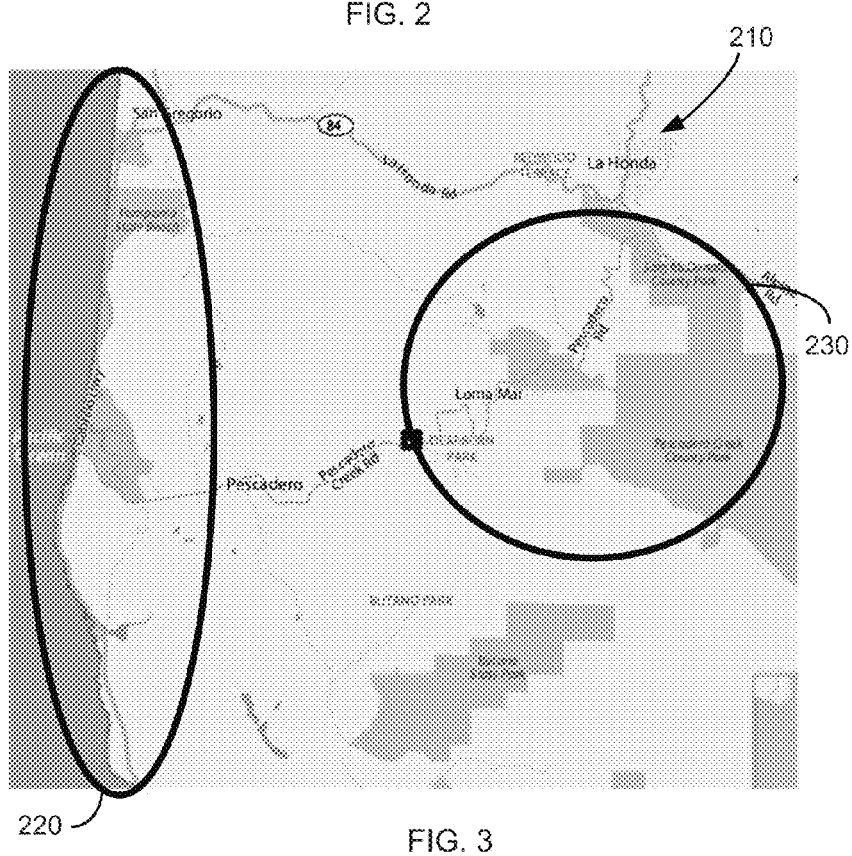

FIGS. 2 and 3 show example of such a characterization and segmentation of a map. In each case a map is used and specific road segments are assigned to different zones types. In FIGS. 2 and 3, three such zones 210, 220, and 230 are shown wherein in this example each zone is assigned to a different zone type. Although the system according to various embodiments is flexible to accommodate a limitless number of zones types, in one embodiment a limit of four zones types may be used as shown in FIGS. 2 and 3: a first zone type 210 may be characterized by time sensitive adverse driving conditions such as climate or weather, traffic conditions, or road work; a second zone type 220 may be characterized by dynamic driving conditions, such as straight long highways, windy mountain roads, etc.; and a third zone type 230 may be characterized by scenic driving conditions using parameters as nearby landmarks, ocean, lake, mountains, etc. The remaining areas on the maps form a fourth or default zone type 240 for everything else.

Other zone types can be created, for example, dynamic zone types could be used that vary with the time of day or with the season. Thus, using the time as a variable, a dynamic zone type would create a different playlist during the morning commute as opposed when driving at sunset. Each zone type could be designed to be dynamic and have one or more variables that determine the dynamic state. A map can have a limitless number of marked zones wherein each zone is assigned one of the zone types. For example, the first zone type 210 could be time dependant, and may need to be determined through vehicle connectivity knowing about the state of road traffic, and weather alerts. Such information could be obtained automatically, for example, through the Internet, radio broadcast services, and/or other telematic systems. The idea is to plan for these ahead and enable a smooth transition into either lower volume music to enable the driver to concentrate better, and/or through a smooth transition into more relaxing music. This specific embodiment, thus uses existing data that is available through telematic systems.

The second zone type 220 on the other hand could be generated automatically, or manually and stored as metadata in the navigation database. The system could look at map data and may utilize an approximation of the second derivative of the road as a curve to determine the "curviness" of the road along with elevation data to calibrate whether the system should consider that this a "dynamic" driving condition. According to an embodiment, the system may be operable to always prioritize the first zone type over the second zone type to make sure the system is well suited to the actual environment.

Finally the third zone type 230 may be more subjective and may need to use data from driving clubs, or user input to note which is a truly scenic roads. Some assumptions could be made by the system to cover basic roads provided that there is no data. Examples would be proximity to a landmark, an ocean and/or to a city or proximity to forests or mountains or lakes, etc. According to an embodiment, such information could be determined automatically from existing map data.

Other zones types could be defined and added or substituted. According to various embodiments, the system utilizes the zone classifications such that when a driver is going through their regular commute, the audio system would play music, for example, from the default playlist. However, by knowing the location of the car and by determination of which zones types are ahead, and through information of the intended path through navigation data obtained from the navigation system, the system would pre-select a playlist or re-arrange a playlist such that within a predefined time window of entering a new zone of a new assigned type, the system would automatically start playing songs from a new zone's playlist without cutting in the middle of a song. The key to provide the largest impact to the driver is that the transition from one song to the next should be within, for example, 15 seconds or less of the transition boundary into the new zone such that it feels as if the mood is just right when a new song starts as the driver crests the hill, the ocean comes into view, or a driver exits a traffic jam.

Figure 4:
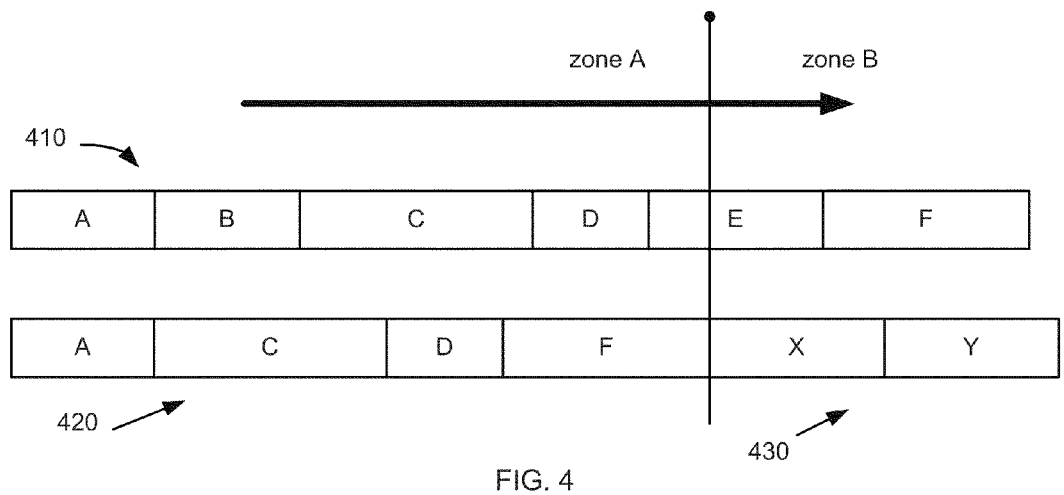
FIG. 4 shows a schematic representing a conversion of a playlist according to one embodiment.

FIG. 4 shows a time line of a transition from zone A to zone B. Initially, when entering zone A, a first playlist 410 has been selected from the playlists assigned to the respective zone type. After determining the time and/or distance to reach zone B, the system re-arranges this playlist to playlist 420. Now, the playlist has a different sequence of songs contained in the original playlist 410 wherein the changed playlist 420 is synchronized with the upcoming transition from zone A to zone B such that a first song X of the next playlist 430 is played in sync with the zone transition.

Figure 5:
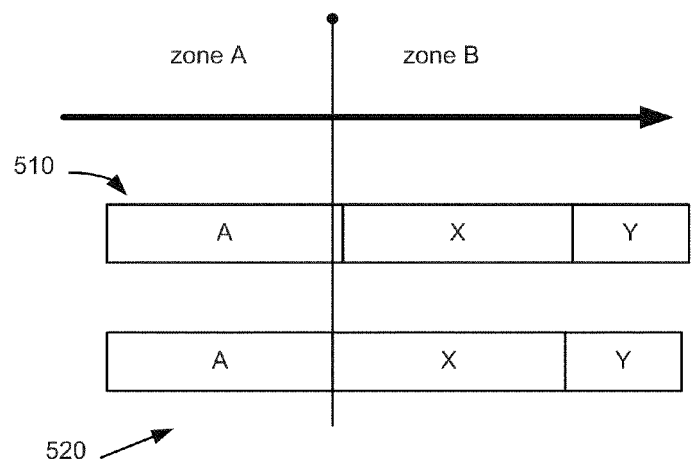
FIG. 5 shows a schematic representing a conversion of a playlist according to another embodiment.
Figure 6:
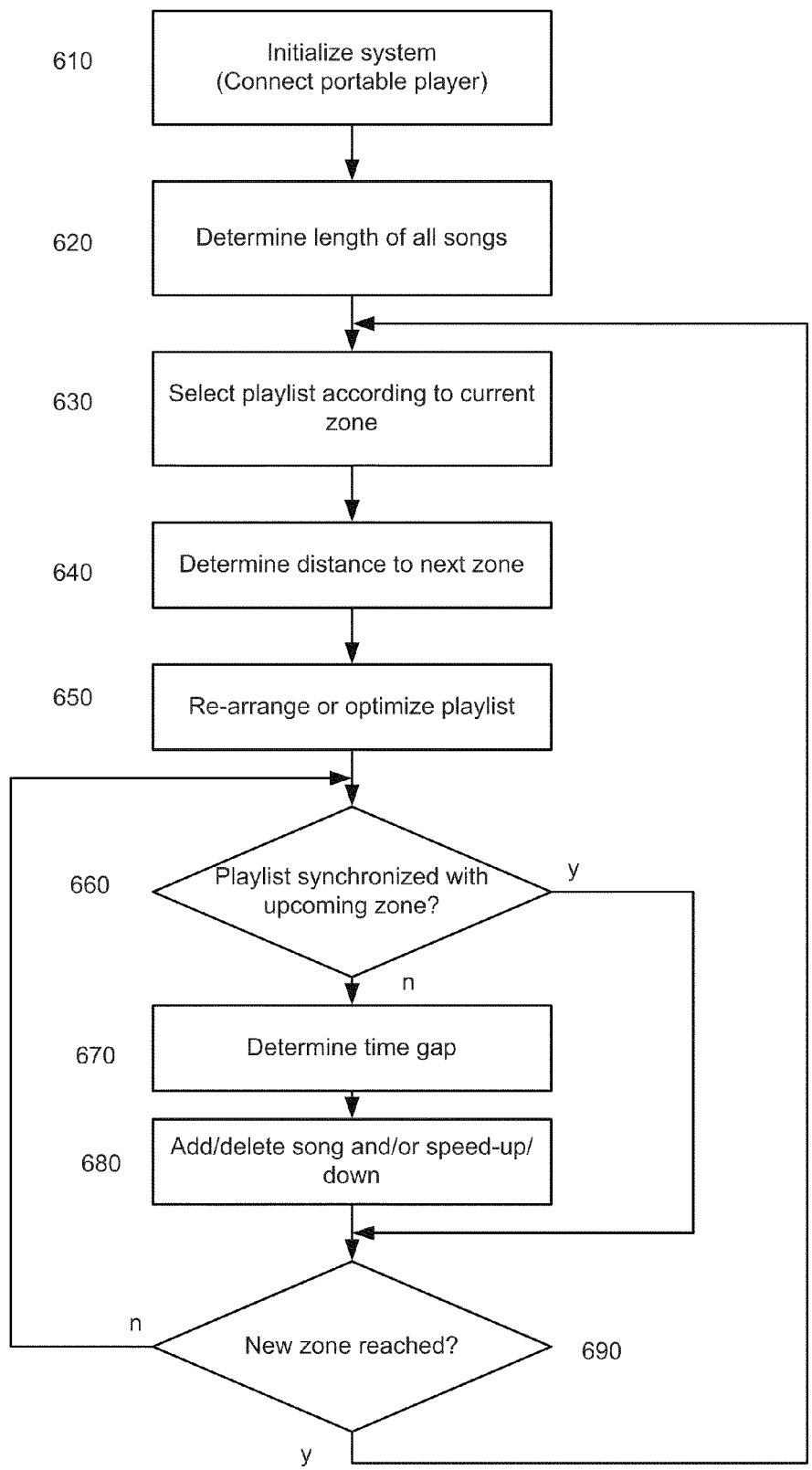
FIG. 6 shows a flow chart according to an embodiment.

FIG. 5 shows another example of altering a playlist which can be performed instead of the re-arranging or in addition depending on a respective zone transition change. In the shown example of FIG. 5, a delay may have caused a time shift in the playback of the playlist that will put the song transition of songs of two consecutive playlists out of sync with the zone transition window. If this gap is greater than a predetermined threshold, the system may simply correct such a gap by speeding up or slowing down playback. Thus, as shown with altered playlist 520, a speed-up which can be performed increasingly and only to a certain extent such that a listener will not perceive the pitch change, will put the playlist 520 back in sync with the upcoming zone transition.

Furthermore, because the amount of additional information included in a digital music file has been steadily increased, such additional information may be used in a system according to an embodiment. Originally there was little info beyond the artist, song title, and genre names. The only distinguishing characteristic of the type of music was the genre, which was often very generic, if present at all. However, some service providers in the music information database industry have recently begun to add additional musical characteristics such as mood and tempo to the track's tag. These identifiers can be used to create the playlist associated with each zone or segments within a zone. For example, a long, straight section of the road could cause the program to cue up tracks that are mellow or slow to provide a relaxed drive, whereas it could also create a playlist of more "aggressive" or fast-paced music pieces if the driver is about to enter a fun, curvy section of the road. The length of each track is also known through metadata in a digital file so that the system would be able to estimate the time to complete the specific section and return the media content to the original status or a next playlist once the section of road has been completed.

Thus, according to an embodiment the vehicle position and navigation data may be used to estimate the time of arrival to a zone boundary to optimize the playlist to ensure a soundtrack for the drive further enhancing the driving experience.

Utilizing the four zones types as shown, for example, in FIGS. 2 and 3 and described above, FIG. 6 shows a flow chart of a possible embodiment of a predictive environment music playlist selection system. According to an embodiment a driver may choose which songs are part of each playlist or metadata is used to automatically create specific playlists according to preselected characteristics. After the songs are loaded into the system or a mobile media player has been coupled with the car entertainment system, the system is initialized in step 610 and updates an internal database with the length of all the song in step 620. In step 630, a playlist is selected and used according to the current zone type in which the vehicle is driving. Then as the vehicle is going through their commute the system calculates the time until arrival at a zone boundary utilizing the vehicle location, speed, and distance to the next upcoming zone boundary as shown in step 640. Next in step 650, the system performs an optimization algorithm to arrange the playlist such that it minimizes the time difference between the zone transition and the end of a song/beginning of the next song from a new playlist. The optimization could either be through a brute force approach, or utilize one of several well known optimization heuristics. While the system performance will increase, making it easier to achieve a song transition closer to the zone boundary, as the number of songs in each playlist increases there may still be some amount of room where the transition is not quite ideal. The key factor is that the song transition matches as closely as possible to the actual zone boundary. According to an embodiment, as mentioned before, to more closely match the ideal transition the system could slightly and imperceptibly speed up or slow down the songs in the playlist to achieve the transition. This speed-up slow-down may be used only to up to a predefined percentage. To this end, the system constantly checks whether the playlist is synchronized to the next upcoming zone in step 660. Moreover, if the driver decides to change his route a different zone may be the next zone. Hence, the system also monitors this parameter and may eventually change the next zone and distance data. If the playlist is becoming out of sync, the system the determines the respective time gap in step 670. As shown in FIGS. 4 and 5, depending on the time gap, the playlist may be re-arranged by adding or deleting a song and/or fine tuned by speeding or slowing down playback. These steps repeat if a new zone of another type is reached as determined in step 690.

The system can also look at various music characteristics, such as beats per minute to identify padding songs that it can use to make the transition more effective. This coupled with the added metadata available in digital music makes the creation of a transition of playlists easier to prepare.

It will be appreciated that while the disclosure is particularly described in the context of entertainment systems in vehicles and associated methods, it may be similarly applied in other contexts. Additionally, it should be understood that various changes, substitutions and alterations can be made herein without departing from the spirit and scope of the disclosure as illustrated by the following claims.

What is claimed is:

1. An entertainment system comprising:
a music storage system operable to store a plurality of music pieces;
a playback system coupled with said music storage system;
a navigation system providing current map information including a present location, wherein a current map comprises a plurality of zones, each zone being assigned to one of a plurality of zone types;
a controller coupled with said navigation system and said music storage system for controlling playback of selected music pieces, wherein the controller maintains a plurality of playlists, each playlist comprising a plurality of music pieces and wherein each playlist is assigned to at least one zone type; wherein the controller receives information of a present location and a current zone type and selects an assigned playlist, wherein the navigation system further provides information about at least one of a distance or time to a next zone, and wherein the controller modifies the assigned playlist such that a transition to said next zone is timely synchronized with the ending of a music piece of the assigned playlist.

2. The system according to claim 1, wherein the controller is further operable to define said zones according to manual input.

3. The system according to claim 1, wherein the controller is further operable to define said zones automatically according to metadata or additional map information.

4. The system according to claim 1, wherein a zone is assigned to a zone type by at least one of external driving conditions, environmental factors surrounding a road in said zone, and the shape of a road in said zone type.

5. The system according to claim 1, wherein the transition to said next zone is defined by a time window.

6. The system according to claim 5, wherein the time window is about 15 seconds.

7. The system according to claim 1, wherein the controller modifies said playlist by re-arranging music pieces of said playlist.

8. The system according to claim 1, wherein the controller modifies said playlist by adding or deleting of a music piece in said playlist.

9. The system according to claim 1, wherein the controller modifies said playlist by speeding-up or slowing-down playback of said playlist.

10. The system according to claim 1, further comprising a telematic system coupled with said controller for receiving traffic related information and wherein said traffic related information is used to correct said distance or time to a next zone.

11. A method for selecting music pieces in a playlist of music playback system, comprising the steps of:
 defining a plurality of zones in a map each zone being assigned to one of a plurality of zone types;
 defining a plurality of playlists, each playlist being associated with at least one zone type and containing a plurality of music pieces;
 determining a position in said map and an current zone;
 determining a zone type of a next zone and a time or distance to transition to said next zone;
 arranging music pieces of a current playlist associated to said current zone such at a transition to said next zone a music pieces in said current playlist ends.

12. The method according to claim 11, wherein the transition to said next zone is defined by a time window.

13. The method according to claim 11, wherein the time window is about 15 seconds.

14. The method according to claim 11, wherein the plurality of zones are defined manual or automatically according to metadata or additional map information.

15. The method according to claim 11, wherein a zone is assigned to a zone type by at least one of external driving conditions, environmental factors surrounding a road in said zone, and the shape of a road in said zone.

16. The method according to claim 11, further comprising the step of modifying said current playlist by re-arranging music pieces of said playlist if the time or distance to said next zone changes.

17. The method according to claim 11, further comprising the step of modifying said playlist by adding or deleting of a music piece in said playlist if the time or distance to said next zone changes.

18. The method according to claim 11, further comprising the step of modifying said playlist by speeding-up or slowing-down playback of said playlist if the time or distance to said next zone changes.

19. The method according to claim 11, further comprising the step of receiving traffic related information and using said traffic related information to correct said time or distance to a next zone.

20. A computer readable media storing instructions executable by a processor or controller in a music entertainment system, wherein when executed the processor or controller controls the music entertainment system to
 define a plurality of zones in a map each zone being assigned to one of a plurality of zone types;
 define a plurality of playlists, each playlist being associated with at least one zone type and containing a plurality of music pieces;
 determine a position in said map and an current zone;
 determnine a zone type of a next zone and a time or distance to transition to said next zone; and to
 arrange music pieces of a current playlist associated to said current zone such that at a transition to said next zone a music pieces in said current playlist ends.

* * * * *

UNITED STATES PATENT AND TRADEMARK OFFICE
CERTIFICATE OF CORRECTION

PATENT NO. : 8,035,023 B2  
APPLICATION NO. : 12/546913  
DATED : October 11, 2011  
INVENTOR(S) : Marcial Hernandez et al.

Page 1 of 1

It is certified that error appears in the above-identified patent and that said Letters Patent is hereby corrected as shown below:

Title page, [73] Please insert the Assignee information as follows:

Volkswagen AG, Wolfsburg (DE)

and

Audi AG, Ingolstadt (DE)

Signed and Sealed this

Seventh Day of February, 2012

David J. Kappos
*Director of the United States Patent and Trademark Office*